United States Patent [19]
Cirigliano

[11] Patent Number: 5,660,101
[45] Date of Patent: Aug. 26, 1997

[54] ROTATABLE COOKING APPARATUS

[76] Inventor: Larry Cirigliano, 624 Hall St., Mamaroneck, N.Y. 10543

[21] Appl. No.: 558,848

[22] Filed: Nov. 15, 1995

[51] Int. Cl.[6] .................................. A47J 37/08; F24B 3/00
[52] U.S. Cl. ........................ 99/395; 99/421 R; 99/427; 126/25 A; 126/25 AA
[58] Field of Search .......................... 99/393, 395, 397, 99/427, 421 R, 421 H, 421 HH, 421 HV; 126/25 A, 25 AA, 25 R

[56] References Cited

U.S. PATENT DOCUMENTS

| | | | |
|---|---|---|---|
| 1,045,049 | 11/1912 | Longfellow et al. | 99/427 |
| 1,517,795 | 12/1924 | Morrisson et al. | 99/397 |
| 1,762,257 | 6/1930 | Burkhardt | 99/397 |
| 2,575,082 | 11/1951 | Wolff | 99/397 |
| 4,114,523 | 9/1978 | Eff | 99/393 |
| 4,492,152 | 1/1985 | DeSantis | 99/397 |
| 4,562,771 | 1/1986 | Williams | 99/397 |
| 4,770,091 | 9/1988 | Vaughn | 99/421 H |
| 4,944,282 | 7/1990 | Aguiar et al. | 99/397 X |
| 5,410,950 | 5/1995 | Rone | 126/25 AA X |

Primary Examiner—Reginald Alexander
Attorney, Agent, or Firm—Martin J. Spellman, Jr.

[57] ABSTRACT

A rotatable cooking apparatus of five main parts: a fire box, a charcoal grill, a rotary transmission system, a cam mechanism, and a food basket. The food basket comprises two grills foldable on top of one another so that food can be secured between them. The charcoal grill is comprised of a wire framework and is attached above the cam mechanism by a support bracket so that the charcoal grill can be raised and lowered. The cam mechanism is attached to the fire box by a cam shaft coupled to the rotary transmission system of four gears connected by two linked chains attached to the food basket by a basket shaft that is connected to a crank shaft. The rotary transmission system is geared so that the charcoal grill can be raised when cooking food on one side of the food basket, lowered so the food basket can be rotated 180°, then raised again in order to cook both sides of the food in the basket at a distance closely adjacent to the heat source.

10 Claims, 14 Drawing Sheets

ROTATABLE COOKING APPARATUS

BACKGROUND OF THE INVENTION

1. Field of the Invention

This invention relates to grills, and more particularly to grills that rotate food articles 180° to expose opposite sides thereof to the heat source.

2. Prior Art

Cooking, specifically barbecuing, requires that the food is turned to expose both sides to the heat source. Normal cooking techniques such as using a fork are time consuming and the constant piercing of the food makes it lose its tenderness. Many ways to turn food without a fork have been devised.

U.S. Pat. No. 4,562,771 issued to James E. Williams shows one system that serves this purpose, but would not work as well for a barbecue grill because half the width of the grill goes below the horizontal. This system would have to be supported high from the heat source to make its rotation possible. Also, this system uses a motor to effect rotation, and therefore is only usable in proximity to a source of electricity.

U.S. Pat. No. 4,492,152 issued to Michelangelo Desantis discloses a rotatable cooking device that flips the food by hand. Although this system does turn over without going much below its horizontal plane. This is accomplished by lifting the grill surface to a 90° position, turning it over, then bringing it down to its horizontal position. Because of the way the device turns, grill users would have some difficulty using it. This system is awkward to use and only works well over an open flame like a camp fire.

All of the rotatable cooking devices mentioned in the prior art suffer from one or more or all the disadvantages stated below, these include:

A. Difficult to rotate a grill by hand;

B. The grill is too far from the heat source, causing a loss in cooking temperature.

C. Heat energy is expended too rapidly;

D. The grill is not able to adjust the height of the heat source; and

E. The lock on the grill does not adjust for the size of food articles.

OBJECTS AND ADVANTAGES

Several of the objects and advantages of the present invention are:

A. To provide a grill that can lift the heat source as close as possible to the food articles, or as needed, without interfering with the grill rotation;

B. To provide a grill that can be easily rotated by hand;

C. To provide a grill that can be used as a conventional grill or as a rotating grill;

D. To provide a grill that is safe and easy to use;

E. To provide a grill that cooks quickly and conserves heat energy; and

F. To provide a grill that can be easily assembled.

Further objects and advantages are: the grill can be adjusted to hold different size food articles and the grill can be unattached for cleaning.

The rotatable cooking apparatus design of the present invention is simple to use and inexpensive to manufacture.

BRIEF DESCRIPTION OF THE DRAWINGS

FIG. 6 is a partial perspective view of FIG. 5.

FIG. 14 is a right side sectional view showing a slightly different version of the preferred embodiment.

FIG. 16 is a partial perspective view of FIG. 17.

FIG. 18 is a perspective view of the food basket in the preferred embodiment.

FIG. 20 is a front sectional view showing a variation in design from the preferred embodiment.

ILLUSTRATIVE SPECIFIC EMBODIMENT

Figure 1:
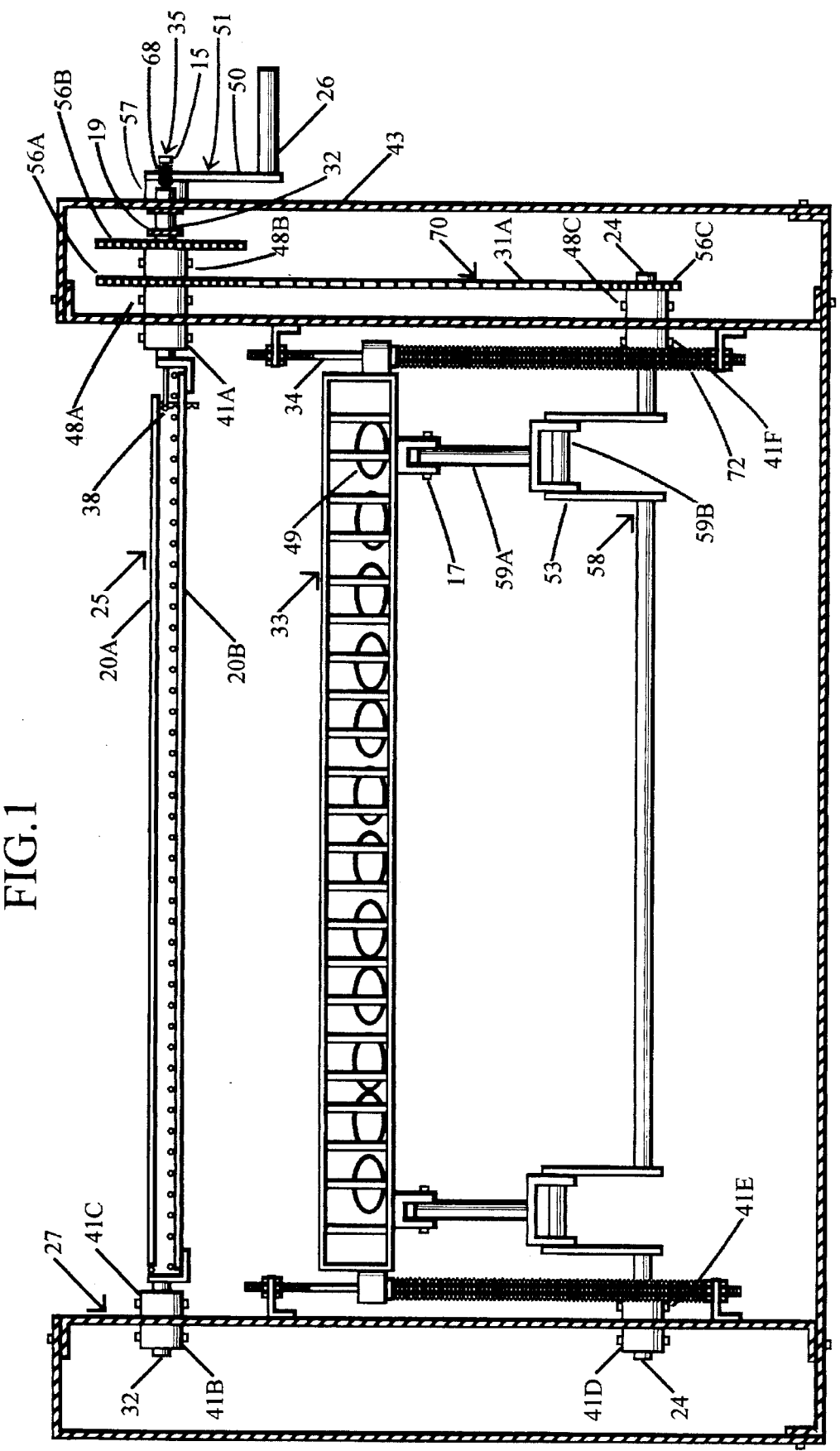
FIG. 1 is a front sectional view of the rotatable cooking apparatus.
Figure 3:
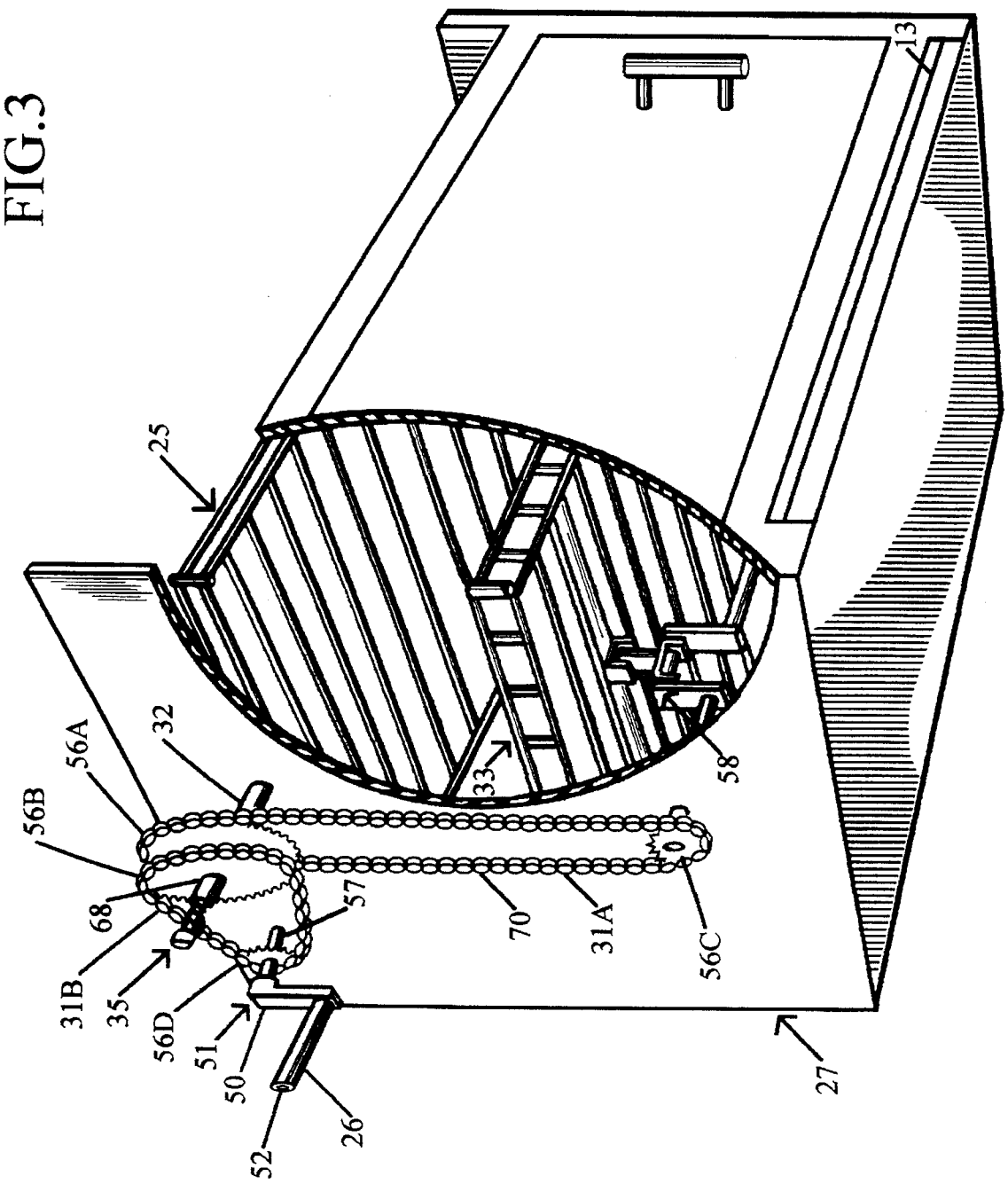
FIG. 3 is a perspective view showing the food basket and locking mechanism.
Figure 4:
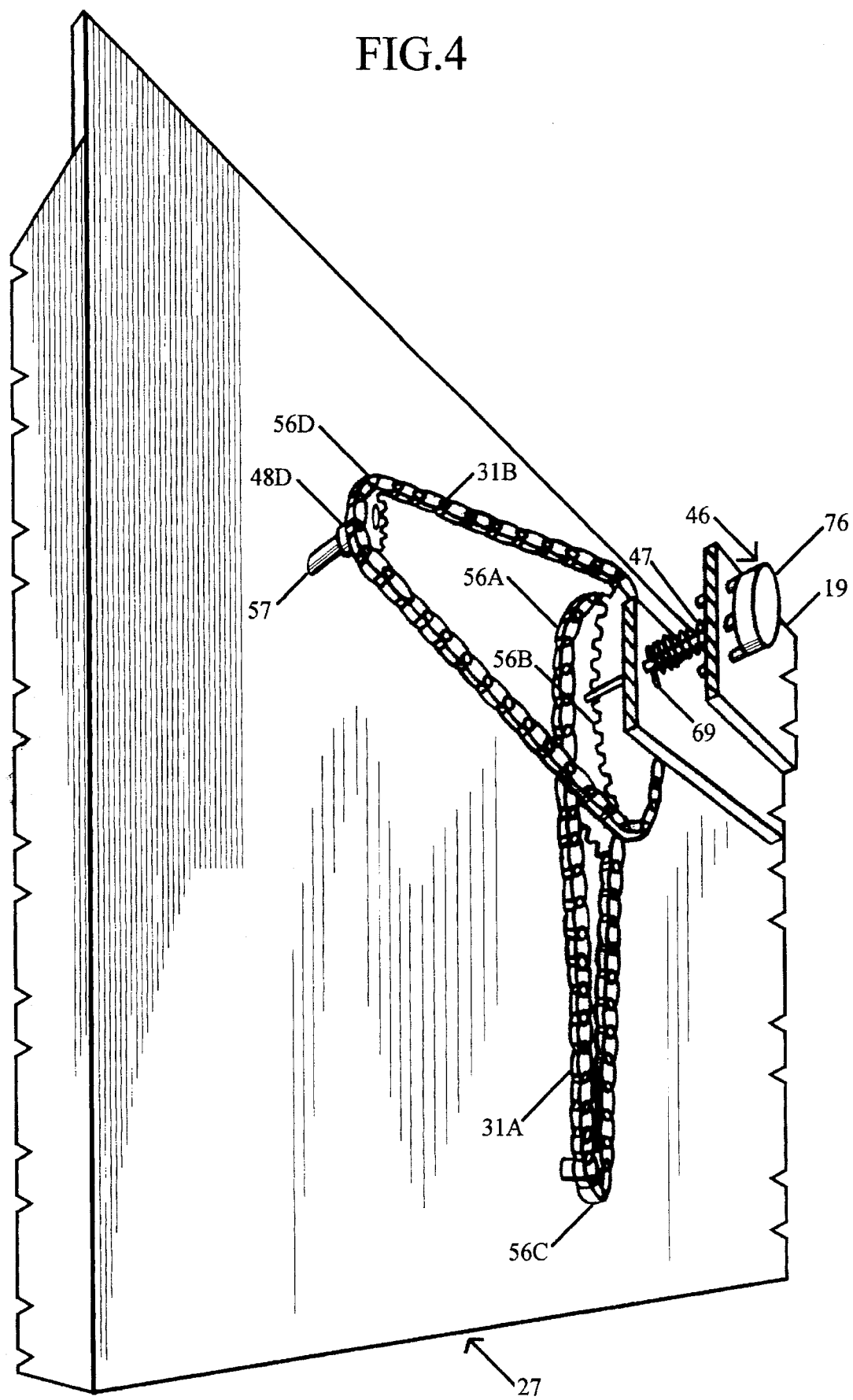
FIG. 4 is a partial perspective view showing the rotary transmission system and sprocket lock mechanism of the rotatable cooking apparatus.

A typical embodiment of the rotatable cooking apparatus is illustrated in FIGS. 1, 3, and 4. The rotatable cooking apparatus is comprised of five main parts: a fire box 27, a charcoal grill 33, a rotary transmission system 70, a cam mechanism 58, and a food basket 25.

Fire box 27 consists of 5 steel plates bolted or welded together, a safety panel 43 and a fire door 28 attached to fire box 27, to conceal the moving parts. Fire box 27 also has openings for a tray 13, an air vent 55, two pairs of openings for a basket shaft 32, and a cam shaft 24. The basket shaft 32 is kept from moving from side to side by shaft rings 41A, 41B, 41C and sprocket ring 48A. Cam shaft 24 is held in place by a shaft ring 41D, 41E, 41F and sprocket ring 48C.

Cam mechanism 58 includes a cam arm 59A, cam rod 59B, cam crank 53 and cam shaft 24. The cam arm 59A is coupled to cam crank 53 by the cam rod 59B which is bolted or welded to the cam crank 53. The cam crank 53 is connected to the cam shaft 24 at a 90° angle.

Rotary transmission system 70 (FIGS. 1 and 4) consists of basket shaft sprockets 56A and 56B, cam sprocket 56C, and crank shaft sprocket 56D. Basket shaft sprockets 56A and 56B are bolted to basket shaft 32 by sprocket rings 48A and 48B. Basket shaft sprocket 56A is connected to a linked chain 31A that is coupled to cam sprocket 56C. Cam sprocket 56C is bolted to cam shaft 24 by sprocket ring 48C. Crank shaft sprocket 56D (FIGS. 1, 3, and 4) is connected to basket shaft sprocket 56B by link chain 31B. Crank shaft sprocket 56D is bolted to crank shaft 57 by sprocket ring 48D.

The sprocket lock mechanism 46 is comprised of a sprocket lock bolt 76, sprocket lock compression spring 47 which is attached to sprocket lock bolt 76, and cotter pin 69 that holds sprocket lock compression spring 47 in place. Sprocket lock mechanism 46 is held adjacent to crank shaft sprocket 56B by the shaft support bracket 19.

The rotary transmission system 70, also having a manual turning mechanism 51, includes a crank ring 57, attached to basket shaft 32, and crank 50 having rod 52. Bolted to the rod 52 is a crank handle 26 made of wood or plastic.

Referring now to FIGS. 1, 3, 4, 11, 14, and 18, food basket 25 is comprised of food basket grills 20A, 20B which are joined together by a basket hinge 22 so that food can be placed in between the food basket grills 20A and 20B.

The food basket 25 is attached to the food basket lock mechanism 35 which is comprised of four main parts: a lock rod 36, a lock plate 38, a basket lock compression spring 68, and a lock bolt 15. Basket lock compression spring 68 is attached to lock rod 36 in a position that holds the lock rod 36 against lock plate 38 which in turn holds basket grills 20A and 20B together when food is placed between them.

Also food basket 25 is attached to fire box 27 by basket shaft 32 which is kept in place by a shaft rings 41A, 41B, 41C and sprocket ring 48A. Food basket 25 is bolted to basket shaft 32 by a shaft plate 37.

Charcoal grill 33 is made up of a steel grill 62 that is rectangular in shape and attached to cam mechanism 58 by a support bracket 17.

Charcoal grill 33 is attached on its four corners by a guide ring 10 that fits into a guide rod 34. A guide rod spring 72 is coupled to guide rod 34 which rests below guide ring 10 to stabilize charcoal grill 33 in motion.

Additional embodiments are shown in FIGS. 2, 5, 6, 7, 8, 9, 10, 12, 15, 16, 17, 19, 20, 21, and 22.

Figure 2:
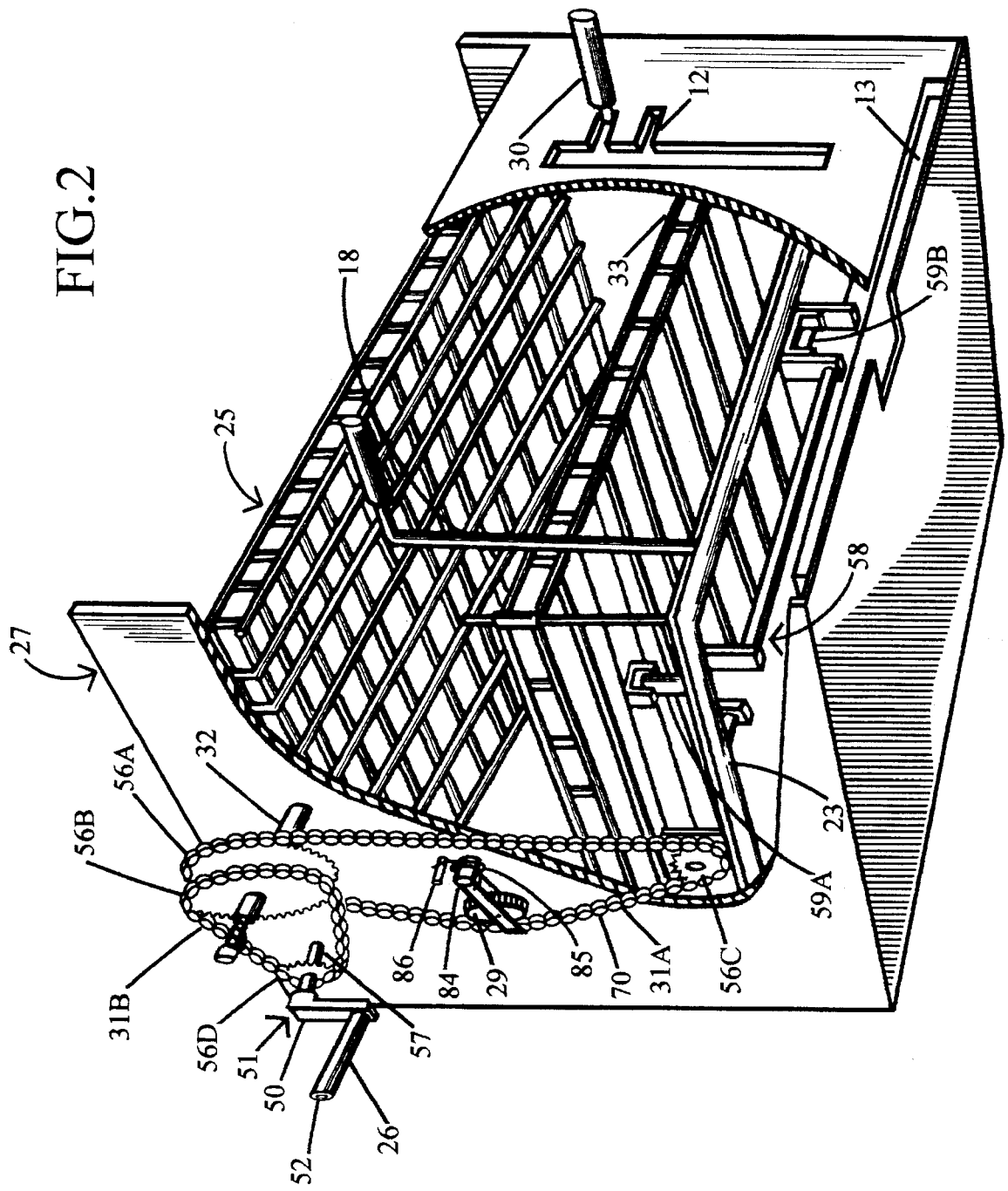
FIG. 2 is a perspective sectional view showing the exterior and interior views.

In FIG. 2, the rotatable cooking apparatus is shown with a tension sprocket 29 that has three main parts: a guide bracket 84, a guide torsion spring 86 which is connected to the guide bracket 84 and to the guide bracket rod 85 which is attached to the guide bracket 84 that allows cam mechanism 58 to be adjusted in height from food basket 25. Cam mechanism 58 can be moved in height by moving lift handle 30 into a different groove slot 12.

Figure 6:
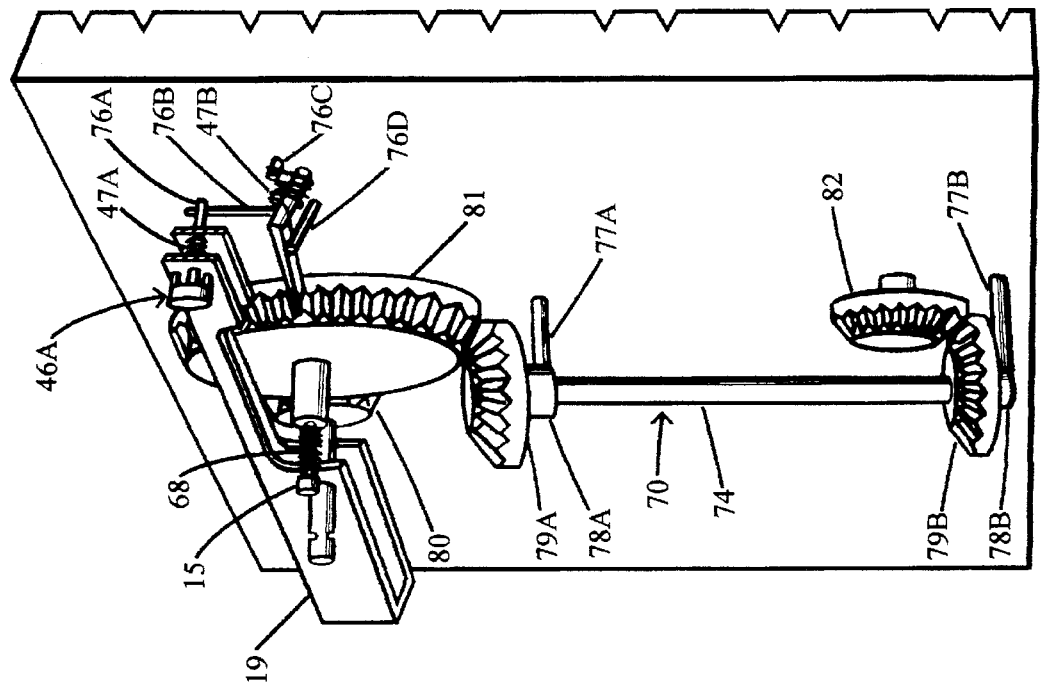
FIGS. 5-21 are partial front sectional views showing variations in design from the preferred embodiment.
Figure 5:
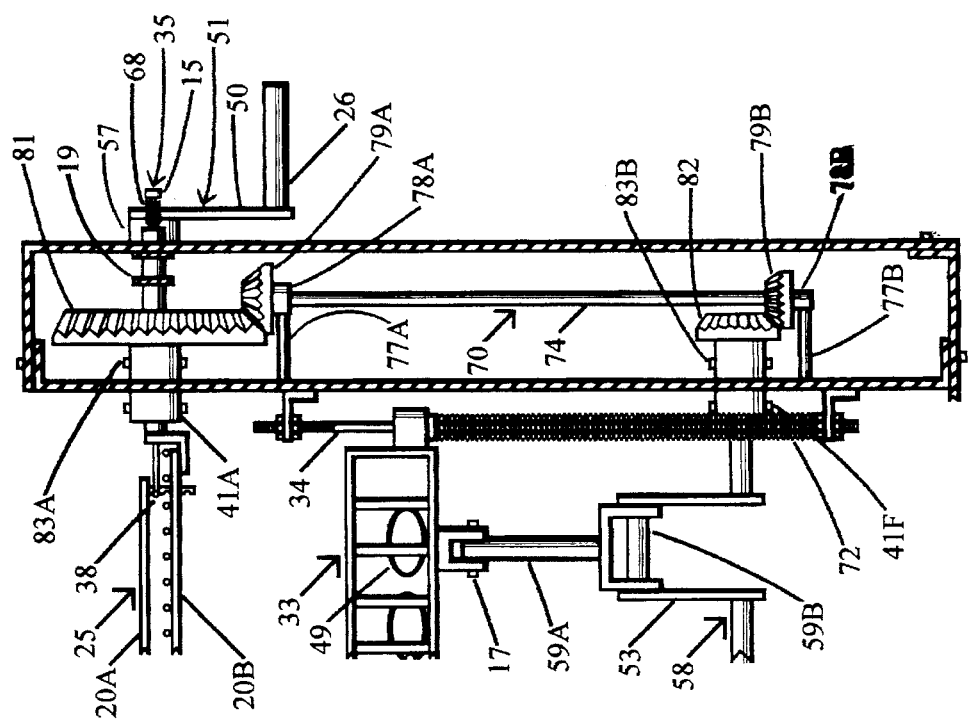

In FIGS. 5 and 6, rotary transmission system 70 functions the same as previously described, but has a crank shaft gear 80 bolted to crank shaft 57. The crank shaft gear 80 is mated to a basket shaft gear 81 that is bolted to basket shaft 32 by gear ring 83A. The basket shaft gear 81 has a second set of teeth which are mated to a drive shaft gear 79A coupled to a drive shaft 74. The shaft 74 and is connected to a second drive shaft gear 79B that is mated to cam gear 82 which is bolted to cam shaft 24 by gear ring 83C.

The drive shaft 74 is held in place by support rings 78A and 78B that are connected to support rods 77A and 77B that are welded or bolted to fire box 27.

The rotary transmission system 70 shown in FIGS. 5 and 6 has a gear lock mechanism 46A that is coupled to the basket shaft gear 81 by a gear L bolt 76B. The gear L bolt 76B is kept in place against basket shaft gear 81 by a gear lock torsion spring 47B that is attached to gear L bolt 76B and a spring bolt 76C. A support bolt 76D keeps gear L bolt 76B in a level position and prevents basket shaft gear 81 from being rotated in more than one direction.

Figure 8:
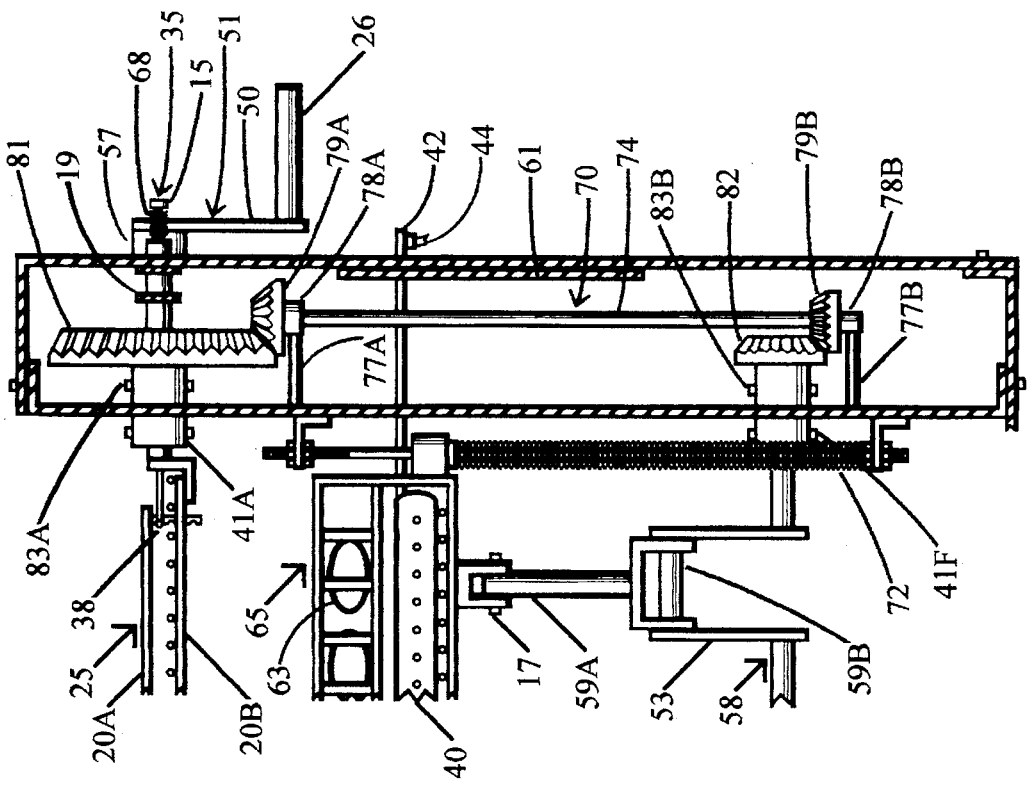
Figure 7:
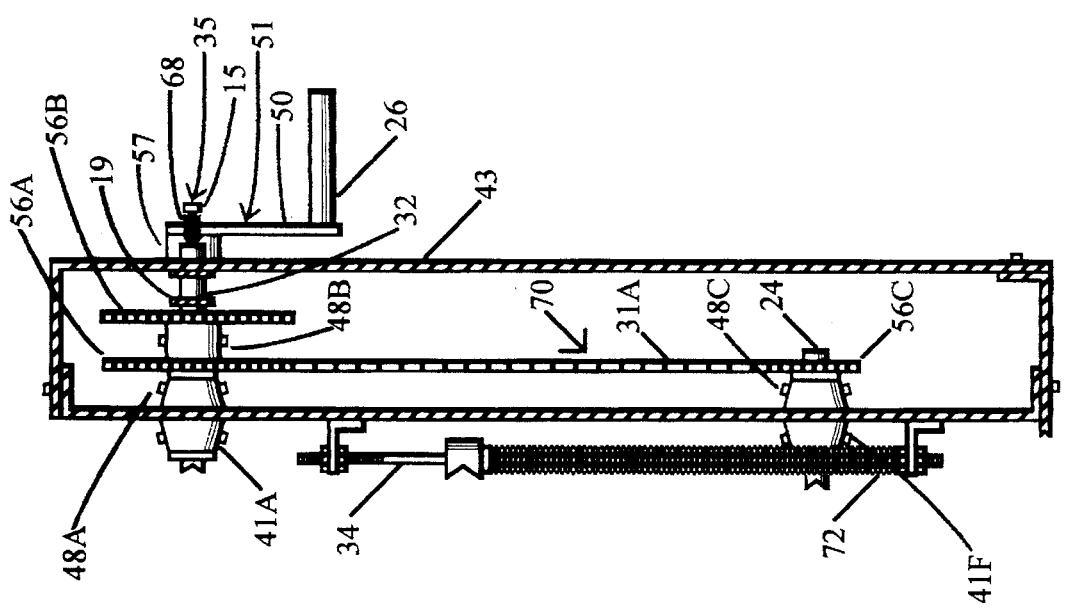
Figure 10:
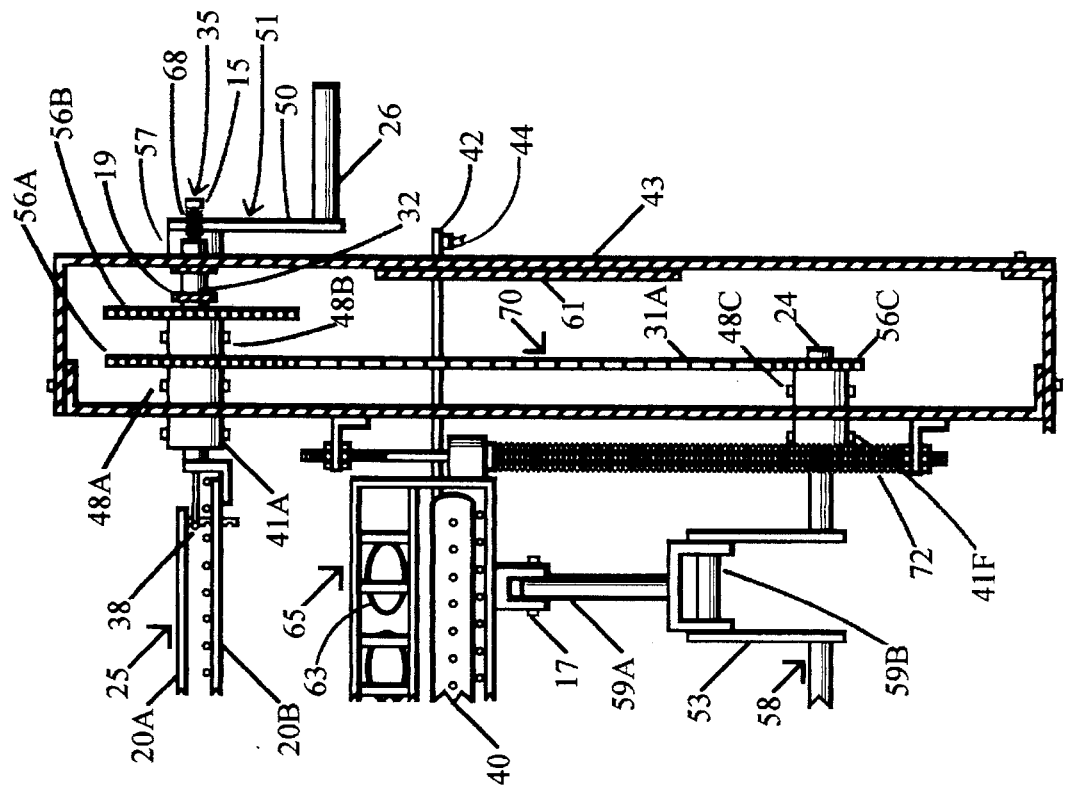

In FIGS. 8 and 10 a gas burner 40 is attached to a gas burner support frame 65. On top of gas burner support frame 65 is lava rock 63. Gas burner 40 is coupled to a gas pipe 42 that protrudes out of the fire box 27 and is coupled to a gas hose 44 that leads to the gas regulator and gas source.

Figure 9:
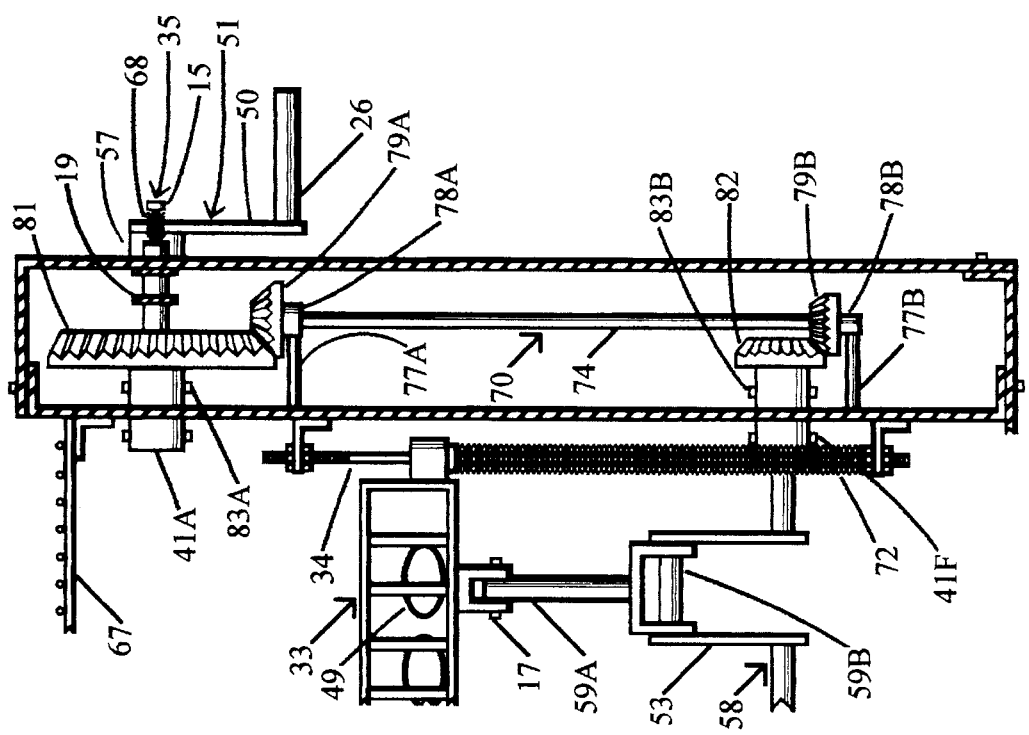
Figure 11:
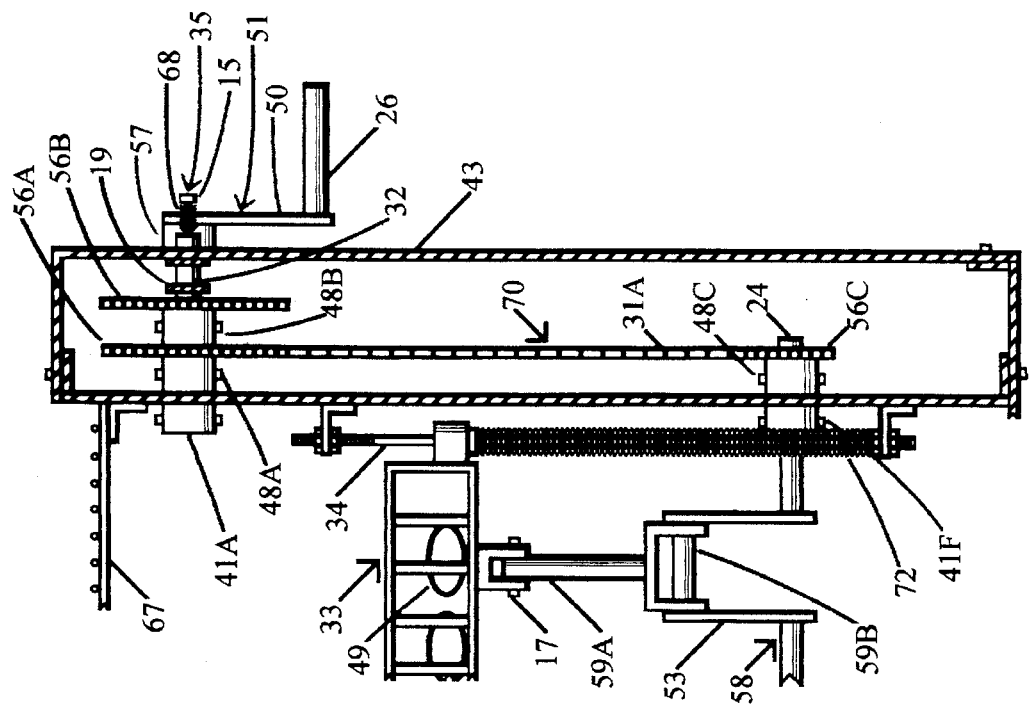
Figure 12:
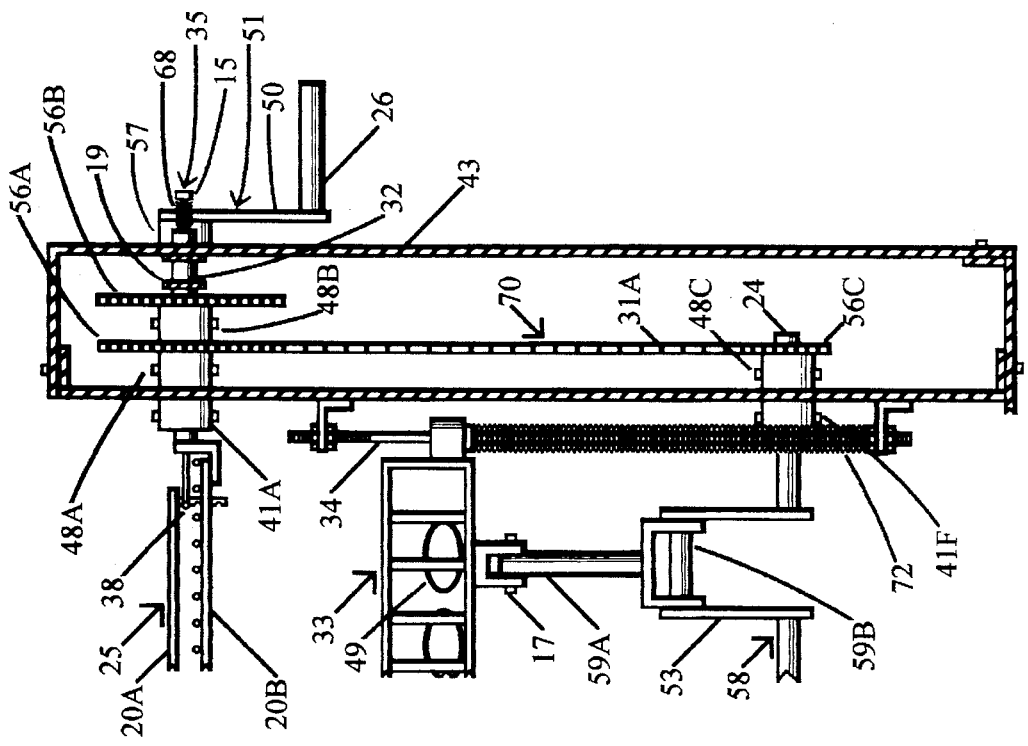
Figure 14:
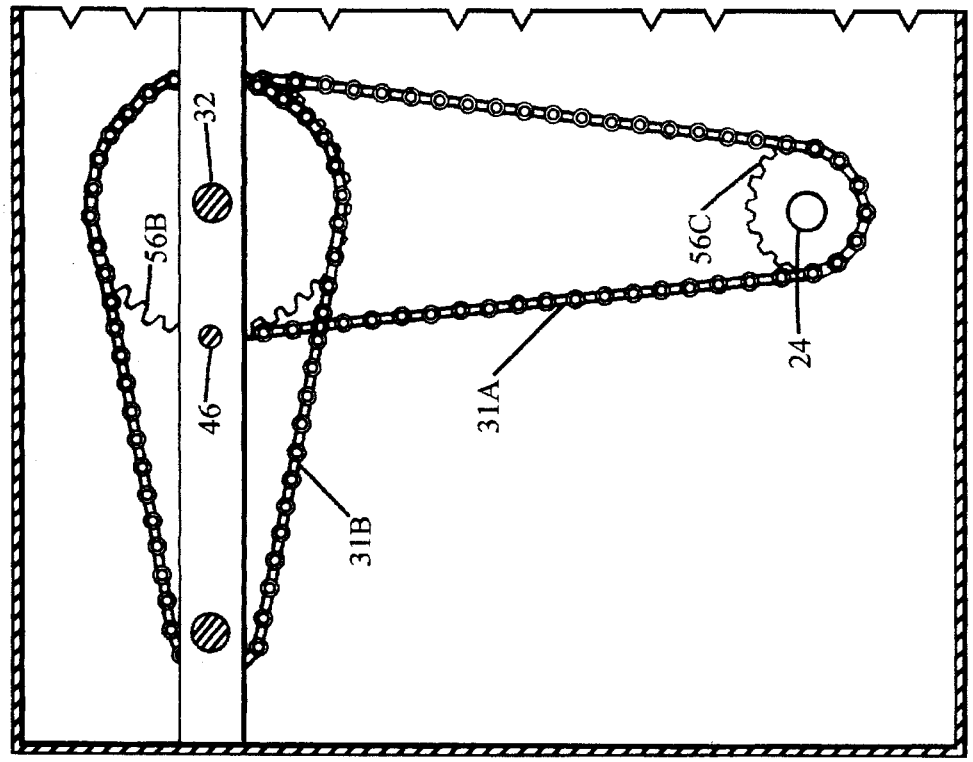
Figure 13:
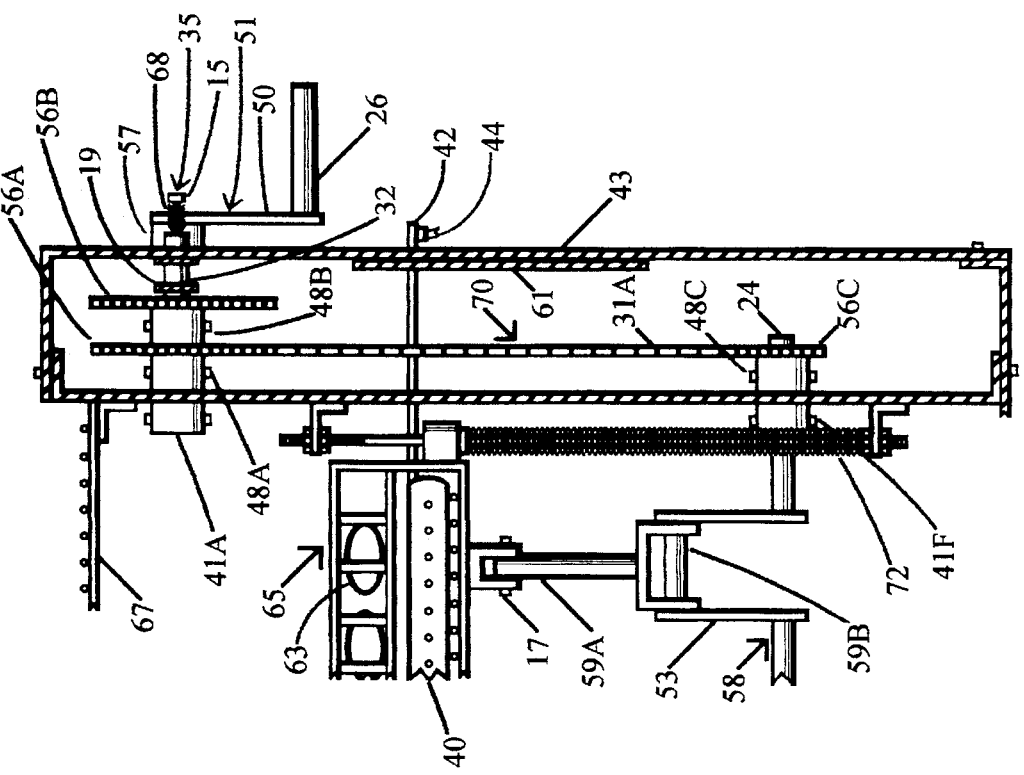

In FIGS. 9, 12, and 13 the rotatable cooking apparatus has a cooking grill 67 in place of food basket 25. Cooking grill 67 is directly connected to the fire box 27 by being bolted, welded or set on top of brackets that are attached to the sides of the fire box 27.

Figure 15:
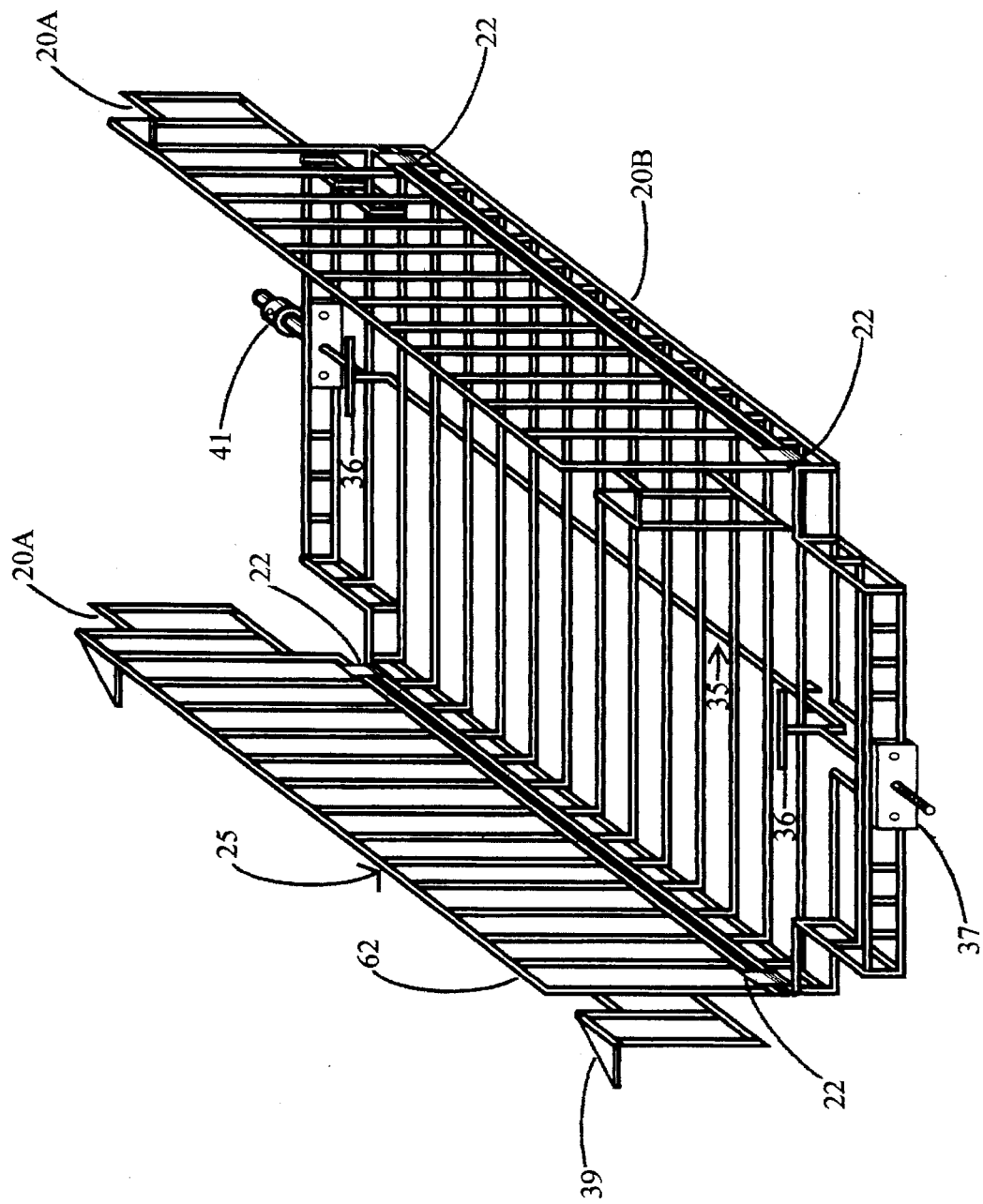

In FIG. 15 a different version of food basket 25 is shown which has a guide triangle 39 instead of lock plate 38, and a food basket grill 20A that opens from the center instead of from one side.

Figure 17:
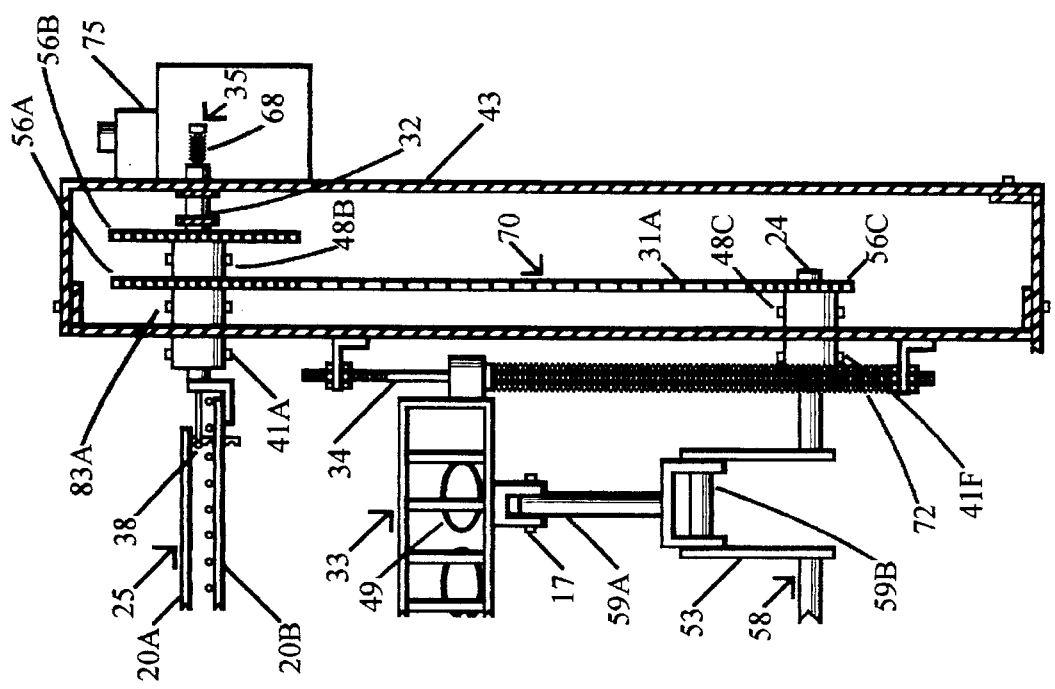
Figure 16:
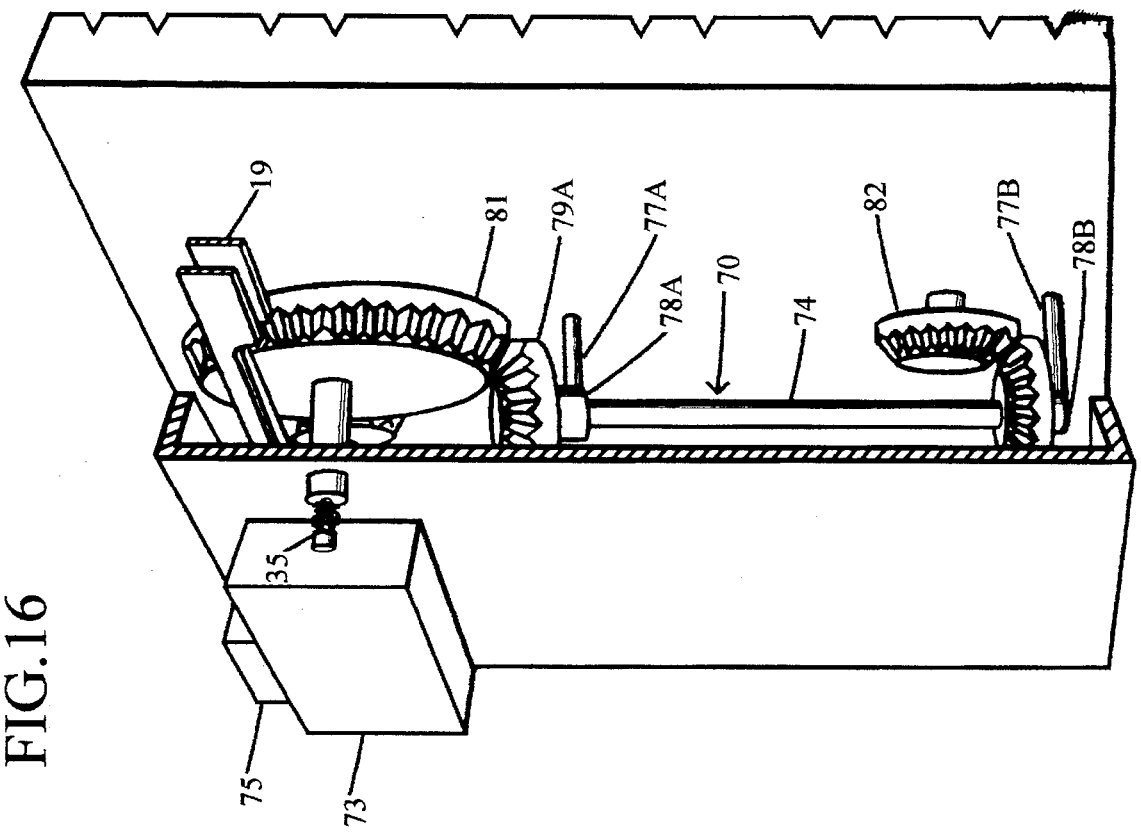

In FIGS. 16 and 17 a rotisserie motor 73 and a timing device 75 that are well known in the art are used in place of crank shaft handle 26 to rotate the rotatable cooking apparatus. The timing device 70 can be programmed to turn at different intervals.

Figure 19:
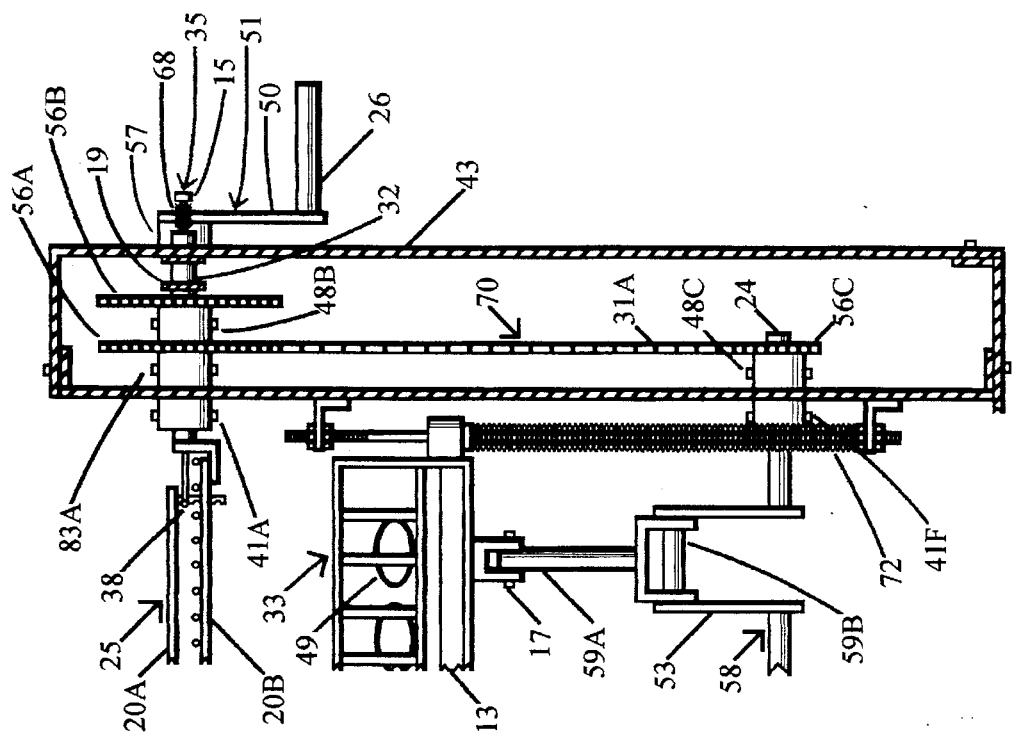
Figure 18:
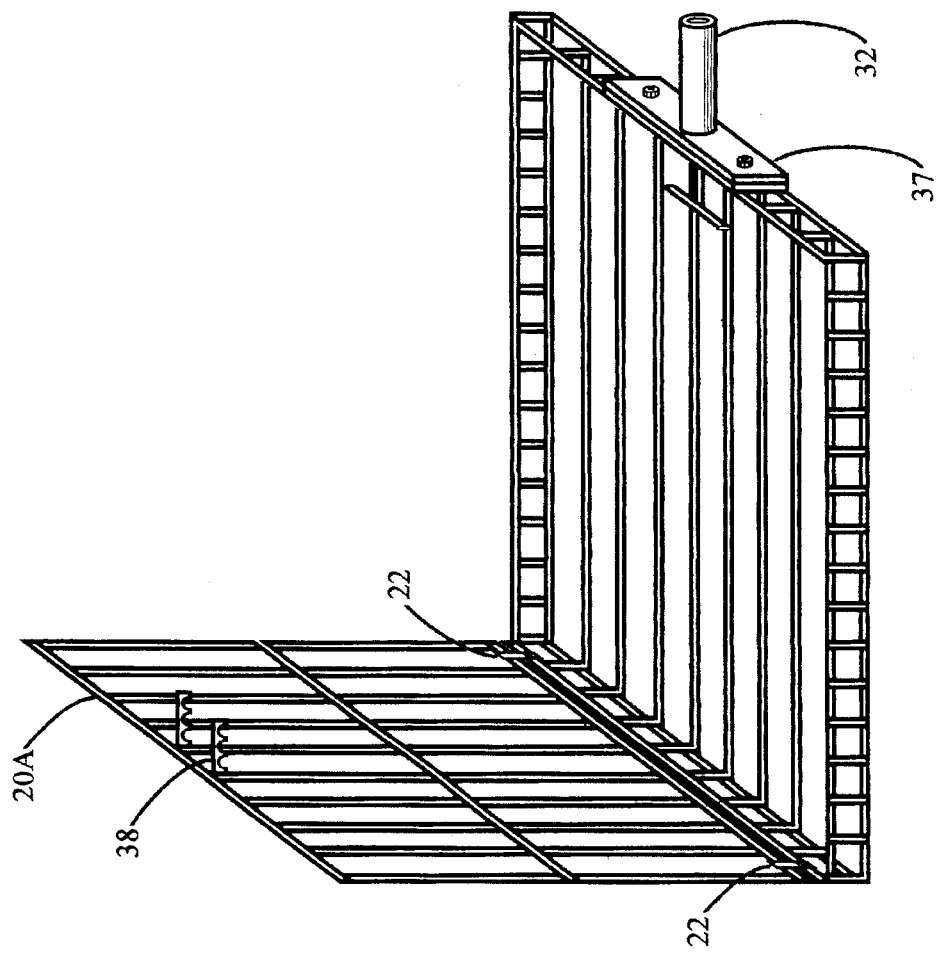

In FIG. 19 charcoal grill 33 is modified to hold ash tray 13 above cam mechanism 58 instead of below it. The ash tray 13 can be slid in and out for easy cleaning.

Figure 20:
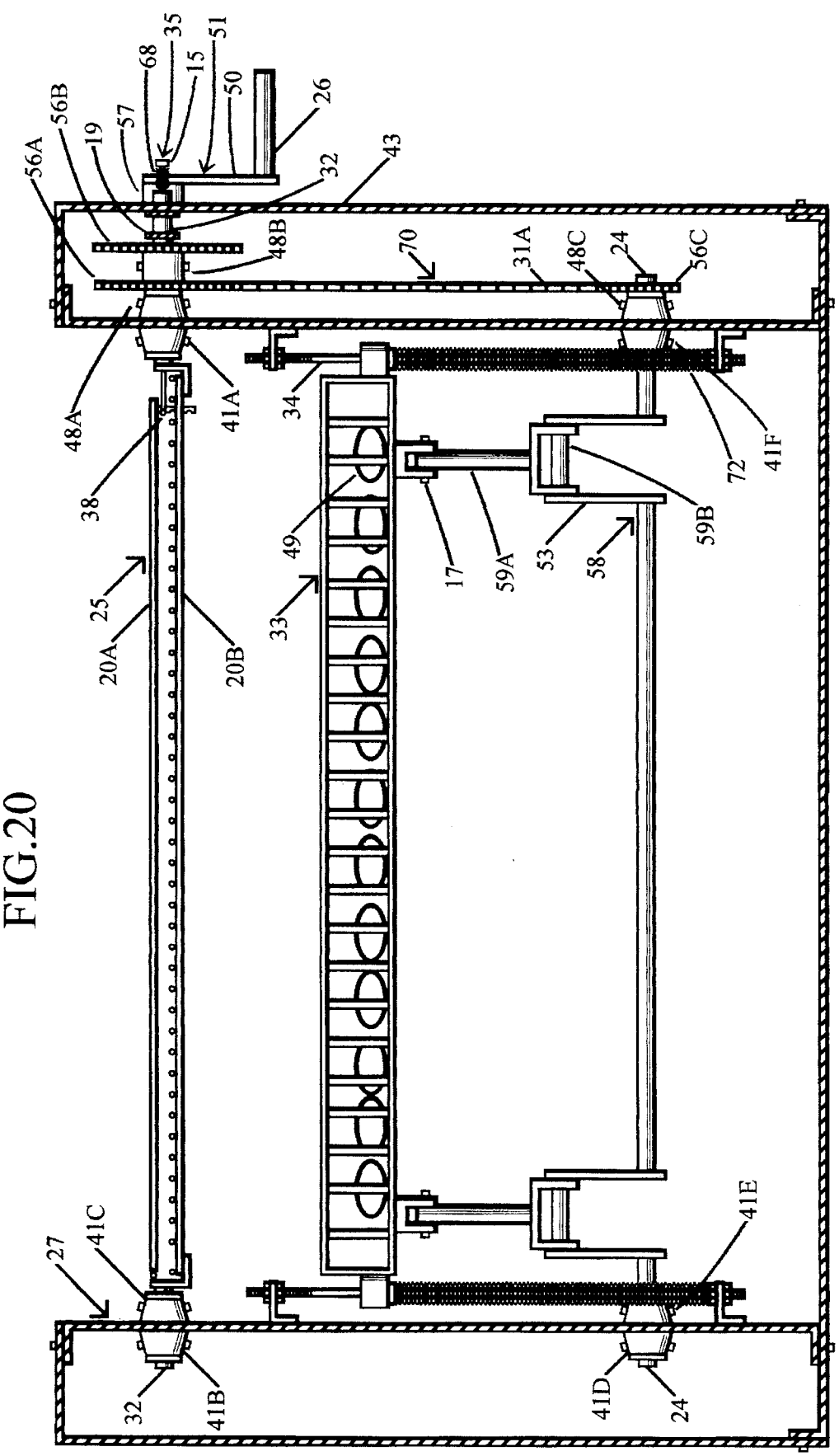

In FIG. 20 the shaft rings 41A, 41B, 41C, 41D, 41E, 41F and sprocket rings 48A, 48C can have ball bearings inside them so that they rotate with less resistance.

Figure 21:
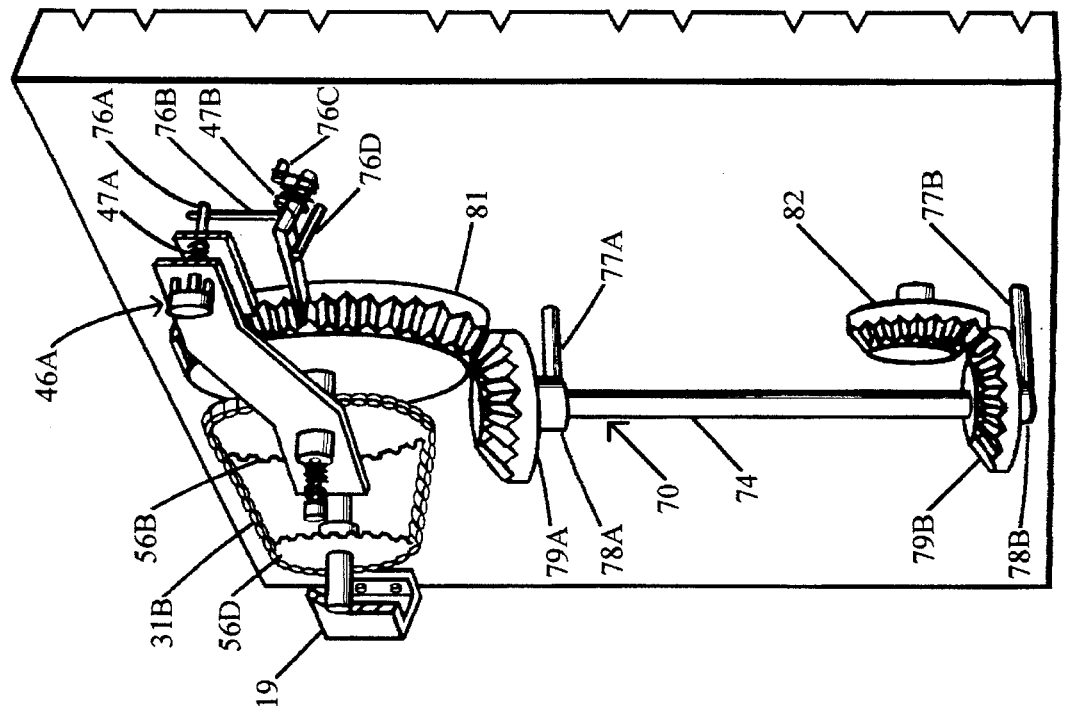
Figure 22:
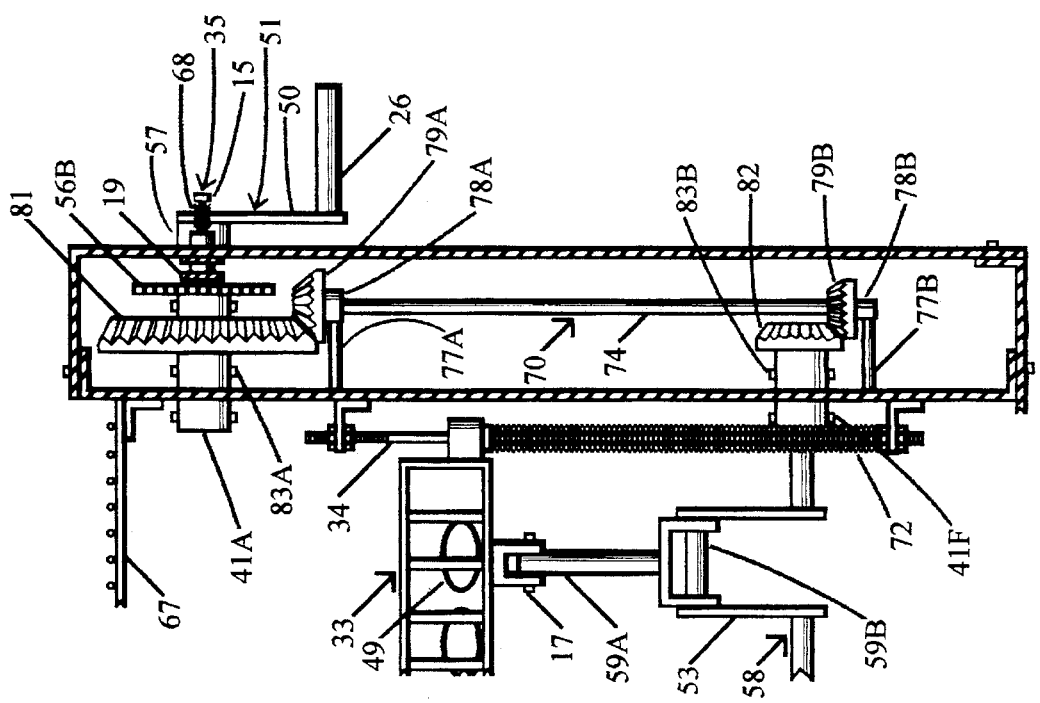
FIG. 22 is a partial perspective view of FIG. 21.

In FIGS. 21 and 22 the rotary transmission system has crank shaft sprocket 56D coupled to link chain 31B that is connected to basket shaft sprocket 56B. The basket shaft sprocket 56B is attached to basket shaft 32. Also attached to the basket shaft 32 is basket shaft gear 81 that is mated to drive shaft gear 79A and is connected to drive shaft 74. Attached to drive shaft 74 is drive shaft gear 79B that is mated to cam gear 82.

OPERATION

Having described the construction of the preferred embodiment of FIGS. 1, 3, and 4, the operation thereof will now be described. Grills 20A and 20B are separated to place the food between them. This is accomplished by pushing in the lock bolt 15, which releases lock plate 38, allowing grill 20A to be separated from grill 20B. Food articles are then placed inside grill 20B. Grill 20A is then closed down on the food articles. Lock bolt 15 is then released which presses lock bolt 15 against lock plate 38, effectively locking grills 20A and 20B together. Lock plate 38 has notches in it so that grills 20A and 20B can be adjusted to accommodate different size food articles.

The food basket 25 is rotated by pulling out gear bolt 75 and turning it ninety degrees, then turning crank shaft handle 26 one-hundred-eighty degrees. This action simultaneously turns the food basket 25 one hundred-eighty degrees, and lowers the charcoal grill 33 so that the food basket 25 can turn one-hundred-eighty degrees, without interfering with charcoal grill 33. The same process is repeated to cook the opposite side of the food article in the food basket 25.

In the embodiment of FIG. 2 the operation is the same as in the preferred embodiment except that the cam mechanism 58 can be adjusted in height by moving lift handle 30 into a different groove slot 12. In the cases of FIGS. 5,6,7,8,9, 10,12,13,15, and 21, the operation is identical to the preferred embodiment.

The rotatable cooking apparatus of the present invention provides a highly reliable, easy-to-use device that can rotate a large cooking area closer to the heat source, saving time and energy. Furthermore, the rotatable cooking apparatus has additional advantages:

It has few parts and can be easily assembled.

It is faster and more convenient to use than prior grills.

It is easy to clean and the grill surface can be easily replaced if damaged.

It can cook food of various sizes and shapes.

It can be powered by hand or by a rotisserie motor.

It can be made to work with charcoal or gas as the heat source.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

I claim:

1. A cooking apparatus for cooking an article of food comprising: a fire box; a means for holding food articles in place supported within said fire box; a rotary transmission means attached to said fire box, said rotary transmission means having a manual turning means coupled thereto; a cam mechanism coupled to said rotary transmission means by a shaft means; and a heating means mechanically coupled to said cam mechanism, whereby upon rotation of said manual turning means the distance of said heating means form said food holding means is varied.

2. A cooking apparatus as claimed in claim 1 in which said means for holding food articles in place is connected to said rotary transmission means for rotation of said food articles.

3. A cooking apparatus as claimed in claim 2 in which said rotary transmission means is comprised of four pulleys and two drive belts.

4. A cooking apparatus as claimed in claim 3 in which said heat means further comprises a support frame which frame is attached to four guide rods having four compression springs coupled to said guide rods and which is attached to said fire box.

5. A apparatus as is claimed in claim 3 in which said rotary transmission means further comprises a locking mechanism whereby said rotary transmission means can be locked in place.

6. A cooking apparatus as claimed in claim 2 wherein said rotary transmission means comprises a set of gears, a drive shaft and a gear locking mechanism.

7. A cooking apparatus as claimed in claim 2 wherein said rotary transmission means comprises four sprockets attached by two linked chains.

8. A cooking apparatus as claimed in claim 2 wherein said rotary transmission means comprises five gears and a drive shaft.

9. A cooking apparatus as claimed in claim 2 wherein said rotary transmission means comprises two sprockets attached by a linked chain and having four gears and a drive shaft.

10. A cooking apparatus as claimed in claim 5 wherein said means for holding food articles in place is made up of two grills of equal size having hinges so that the grills can be opened apart so that food may be placed inside.

* * * * *